United States Patent
Yamamoto et al.

(10) Patent No.: US 7,496,006 B2
(45) Date of Patent: Feb. 24, 2009

(54) OPTICAL DISC CONTROLLER AND OPTICAL DISC DEVICE

(75) Inventors: Takeharu Yamamoto, Takatsuki (JP); Kenji Fujiune, Takatsuki (JP); Shinichi Yamada, Katano (JP); Katsuya Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 545 days.

(21) Appl. No.: 10/691,848

(22) Filed: Oct. 23, 2003

(65) Prior Publication Data

US 2004/0081040 A1      Apr. 29, 2004

(30) Foreign Application Priority Data

Oct. 23, 2002   (JP)   ............................. 2002-308232

(51) Int. Cl.
    *G11B 7/00*   (2006.01)
(52) U.S. Cl. ............... 369/30.27; 369/30.21; 369/30.22
(58) Field of Classification Search ............. 369/30.21, 369/30.22, 30.27
    See application file for complete search history.

(56) References Cited

U.S. PATENT DOCUMENTS

| | | | | |
|---|---|---|---|---|
| 4,623,994 | A | * | 11/1986 | Nabeshima et al. ....... 369/30.22 |
| 4,907,214 | A | * | 3/1990 | Nagano et al. ............ 369/44.25 |
| 5,140,571 | A | | 8/1992 | Nishida et al. |
| 5,337,295 | A | * | 8/1994 | Maeda ..................... 369/30.27 |
| 6,009,056 | A | * | 12/1999 | Araki et al. ................ 369/47.4 |
| 6,317,395 | B1 | | 11/2001 | Yamamoto et al. |
| 6,507,544 | B1 | * | 1/2003 | Ma et al. ................. 369/44.41 |
| 7,085,200 | B2 | * | 8/2006 | Okada et al. ............... 369/30.1 |

(Continued)

FOREIGN PATENT DOCUMENTS

EP   1085509 A2   3/2001

(Continued)

OTHER PUBLICATIONS

Chinese Office Action dated Jan. 27, 2006, corresponding to Chinese Patent Appln. No. 200310102552.5.

(Continued)

*Primary Examiner*—Wayne R Young
*Assistant Examiner*—LaTanya Bibbins
(74) *Attorney, Agent, or Firm*—Panitch Schwarze Belisario & Nadel LLP

(57) ABSTRACT

An optical disc controller of the present invention servo-controls an optical disc device which comprises a disc motor rotating an optical disc and an optical head emitting a light beam for recording data on the optical disc and/or reproducing data from the optical disc. The optical disc controller comprises: a variable clock output section for outputting a plurality of clock signals of different frequencies, and a control section which receives from the optical head a signal indicating a deviation from a predetermined target value to servo-control the light beam of the optical disc device and performs an operation according to the signal indicating the deviation so as to obtain and output a signal indicating a control amount. The variable clock output section changes a frequency of the clock signal according to a recording speed and/or a reproducing speed when the optical disc device performs recording and/or reproduction, and the control section performs an operation to be performed in synchronization with the clock signal of the variable clock output section.

4 Claims, 9 Drawing Sheets

U.S. PATENT DOCUMENTS

| | | | |
|---|---|---|---|
| 7,304,920 B2 * | 12/2007 | Arai et al. | 369/44.32 |
| 2002/0080693 A1 | 6/2002 | Ma et al. | |
| 2002/0145955 A1 | 10/2002 | Turner et al. | |
| 2006/0104168 A1 * | 5/2006 | Arai | 369/44.26 |

FOREIGN PATENT DOCUMENTS

| | | | |
|---|---|---|---|
| EP | 1310951 A1 | | 5/2003 |
| EP | 1575038 A1 | | 9/2005 |
| JP | 03-080437 A | | 4/1991 |
| JP | 06-036301 A | | 2/1994 |
| JP | 08-329506 A | | 12/1996 |
| JP | 11-025486 A | | 1/1999 |
| JP | 11025486 A | * | 1/1999 |
| JP | 2000-075966 A | | 3/2000 |
| JP | 2000-0232964 A | | 8/2000 |
| JP | 2001-243710 A | | 9/2001 |
| JP | 2003-045058 A | | 2/2003 |

OTHER PUBLICATIONS

Japanese Notice of Reasons for Rejection issued to the corresponding Japanese Patent Application No. 2003-359469; Mailed Jul. 22, 2008; 6 pages.

European Search Report issued to the corresponding European Patent Application No. 04024402.2; Issued Jul. 25, 2008; 3 pages.

Taiwanese Official Letter issued to the corresponding Taiwanese Patent Application No. 92129307; Dated Aug. 27, 2008; 7 pages.

* cited by examiner

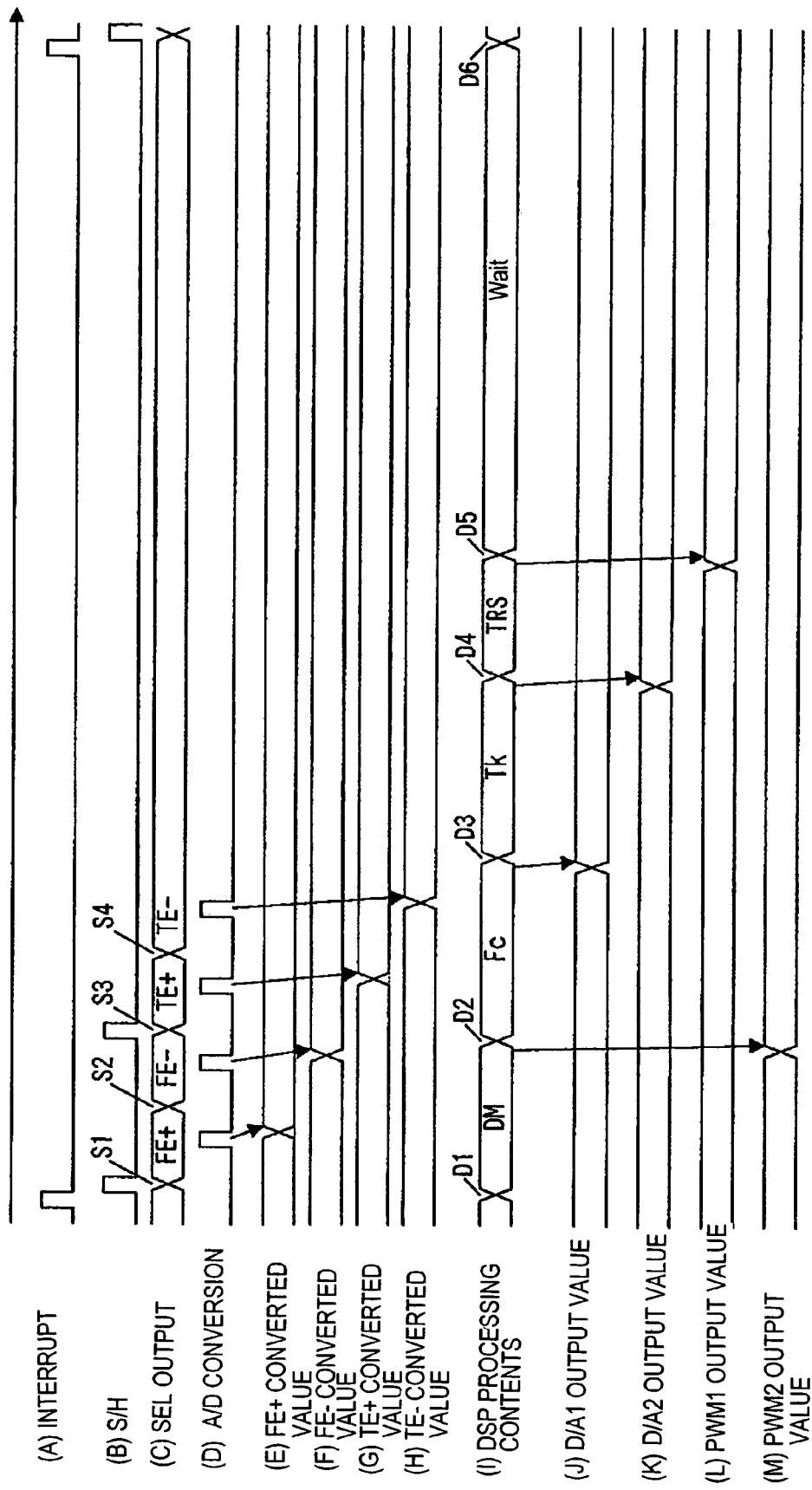

OPTICAL DISC CONTROLLER AND OPTICAL DISC DEVICE

BACKGROUND OF THE INVENTION

1. Field of the Invention

The present invention relates to an optical disc device and particularly relates to an optical disc controller for performing servo control in the optical disc device.

2. Description of the Related Art

Referring to FIGS. 8 and 9, a conventional art will be described below. FIG. 8 is a block diagram showing a conventional optical disc device 400. The configuration of a driving system is mainly shown in FIG. 8. FIG. 9 shows waveforms indicating the timing of controlling constituent elements in the driving system of the optical disc device 400. The optical disc device 400 comprises a disc motor 402, an optical head 403, and a digital signal processor (hereinafter, abbreviated as DSP) 412. The disc motor 402 is loaded with an optical disc 401 and rotates the disc.

The optical head 403 includes a light source (not shown) for emitting a light beam, a converging lens 405 for converging a light beam, an actuator 407 for driving the converging lens 405, a detector 404, and an analog operational unit 408. The optical head 403 emits a light beam converged on the recording surface of the optical disc 401. The photodetector 404 mounted on the optical head 403 detects the reflected light or transmitted light of the light beam and converts the light into an electric signal. As shown in FIG. 8, the photodetector 404 is divided into areas 404a and 404c and areas 404b and 404d along the tangential direction of tracks and is divided into the areas 404a and 404b and the areas 404c and 404d along the perpendicular direction of the tracks. Namely, the detection area of the photodetector 404 is divided into four.

The converging lens 405 mounted on the optical head 403 is driven by the actuator 407 along a focusing direction, which is perpendicular to the recording surface of the optical disc 401, and the radius direction of the optical disc 401. The whole optical head 403 can be moved in the radius direction of the optical disc 401 by a traverse motor 406.

The analog operational unit 408 receives the output of the photodetector 404 and outputs an FE+ signal and an FE− signal. By computing a difference between the FE+ signal and the FE− signal, a focus error signal can be obtained which indicates a displacement between the focus of a light beam and the information recording surface. For example, when the focus error signal is obtained by the astigmatic method, the FE+ signal is generated from an added signal of the photodetectors 404a and 404d and the FE− signal is generated from an added signal of the photodetectors 404b and 404c.

The DSP 412 operates according to an output clock of a clock output unit 423 and performs the following operations according to the output of an interrupt timer 422 shown in FIG. 9(A).

First, the DSP 412 starts, from time D1, an operation for controlling the disc motor (indicated by DM in FIG. 9(I)). The disc motor 402 outputs an FG signal according to a rotational period, and the period of the FG signal is counted by a period counter 421. According to an instruction of a system controller 424, the DSP 412 performs a digital filtering operation on a difference between the output of the period counter 421 and a disc motor rotation target RAM according to a disc motor filter coefficient set for the RAM (not shown) of the DSP 412, and the DSP 412 outputs an arithmetic result, as a control signal for driving the disc motor 402, to a PWM converter 416 at the timing of FIG. 9(M). The PWM converter 416 receives the control signal and performs pulse width modulation thereon and outputs the signal to a driving circuit 420. The driving circuit 420 performs power amplification on the received signal and supplies the signal to the traverse motor 402. Thus, control is performed so as to set the revolution speed (number of revolution) of the disc motor 402 at a predetermined value.

At this point, as shown in FIG. 9(B), an A/D converter 411 transmits an S/H signal to a sample hold circuit 409 in parallel with the above processing and the A/D converter 411 samples and holds the FE+ signal and the FE− signal at time S1. Further, as shown in FIG. 9(C), the A/D converter 411 transmits a control signal so that a selector 410 outputs the FE+ signal at time S1. As shown in FIG. 9(D), the A/D converter 411 performs A/D conversion. As shown in FIG. 9(E), the A/D converter 411 obtains an A/D converted value (FE+ converted value) by converting the FE+ signal to a digital signal. Further, A/D converter 411 transmits a control signal to the selector 410 so that the selector 410 outputs an FE− signal at time S2. As shown in FIG. 9(D), the A/D converter 411 performs A/D conversion. As shown in FIG. 9(F), the A/D converter 411 obtains an A/D converted value (FE− converted value) by converting the FE− signal into a digital signal.

As shown in FIG. 9(I), the DSP 412 starts a focus control operation (indicated by Fc in FIG. 9(I)) from time D2. The DSP 412 calculates a difference between the FE+ signal (FE+ converted value) and the FE− signal (FE− converted value) that have been converted into digital values by the A/D converter 411 and the DSP 412 obtains a focus error signal. According to an instruction of the system controller 424, the DSP 412 performs a digital filtering operation on the focus error signal according to a focus filter coefficient set for the RAM (not shown) of the DSP 412 and outputs an arithmetic result, as a control signal for driving the focusing coil of the actuator 407, to a D/A converter 413 at the timing of FIG. 9(J). The D/A converter 413 converts the output of the DSP 412 into an analog value and outputs the value to a driving circuit 417. The driving circuit 417 performs power amplification on the analog control signal and supplies the signal to the focusing coil of the actuator 407. Thus, control is performed so as to position the convergent point of a light beam on the information recording surface of the optical disc 401.

Moreover, the output of the photodetector 404 is inputted to the analog operational unit 408, and the analog operational unit 408 outputs a TE+ signal and a TE− signal. By computing a difference between the TE+ signal and the TE− signal, a tracking error signal can be obtained which indicates a displacement between the focus of a light beam and a track. For example, when the tracking error signal is obtained by the push-pull method, the TE+ signal is an added signal of signals from the photodetectors 404a and 404c and the TE− signal is an added signal of signals from the photodetectors 404b and 404d.

The A/D converter 411 transmits a control signal to the sample hold circuit 409 so as to sample and hold the TE+ signal and the TE− signal at time S3. Further, the A/D converter 411 transmits a control signal to the selector 410 so as to output the TE+ signal at time S3. As shown in FIG. 9(G), the A/D converter 411 performs A/D conversion to obtains an A/D converted value (TE+ converted value), which is a digital signal of the TE+ signal. Moreover, the A/D converter 411 transmits a control signal to the selector 410 so as to output the TE− signal at time S4. As shown in FIG. 9(H), the A/D converter 411 performs A/D conversion to obtain an A/D converted value (TE− converted value), which is a digital signal of the TE− signal.

The DSP 412 starts a tracking control operation (indicated by Tk in FIG. 9(I)) from time D3. The DSP 412 computes a difference between the TE+ signal (TE+ converted value) and the TE− signal (TE− converted signal) that have been converted into digital values by the A/D converter 411 and the DSP 412 obtains a tracking error signal. According to the instruction of the system controller 424, the DSP 412 performs a digital filtering operation on the tracking error signal according to a tracking filter coefficient set for the RAM (not shown) of the DSP 412 and outputs an arithmetic result, as a control signal for driving the tracking coil of the actuator 407, to a D/A converter 414 at the timing of FIG. 9(K). The D/A converter 414 converts the output of the DSP 412 into an analog value and outputs the value to a driving circuit 418. The driving circuit 418 performs power amplification on the analog control signal and supplies the signal to the tracking coil of the actuator 407. Control is performed so as to position the convergent point of a light beam at the center of the tracks of the optical disc 401.

Further, the DSP 412 starts a traverse control operation (indicated by TRS in FIG. 9(I)) from time D4. According to an instruction of the system controller 424, the DSP 412 performs a digital filtering operation on the tracking error signal according to a traverse filter coefficient set for the RAM (not shown) of the DSP 412 and outputs an arithmetic result, as a control signal for driving the traverse motor 406, to a PWM converter 415 at the timing of FIG. 9(L). The PWM converter 415 receives the control signal, performs pulse width modulation thereon, and outputs the signal to a driving circuit 419. The driving circuit 419 performs power amplification on the received signal and supplies the signal to the traverse motor 406. Hence, the position of the optical head 403 is controlled so as to position the convergent point of a light beam at the center of the tracks of the disc 401.

The DSP 412 waits from time D5 indicating the completion of the traverse control operation (TRS) to time D6 indicating the subsequent output of the interrupt timer 422.

When recording and reproducing speeds are changed in the conventional optical disc device 400, the system controller 424 rewrites the disc motor rotation target RAM, the disc motor filter coefficient RAM, the focus filter coefficient RAM, and the tracking filter coefficient RAM of the DSP 412, as disclosed in, for example, Japanese Laid-Open Patent Publication No. 11-185259. Hence, recording and reproduction are performed while the revolution speed of the disc motor and the filtering characteristics of a focus servo and a tracking servo are changed.

When all kinds of servo control are stopped, the system controller 424 outputs a signal to the clock output unit 423 to stop the supply of clocks to the DSP 412. The DSP 412 goes into a sleep mode to reduce power consumption.

During debugging in the development of the optical disc device 400 or the repair of the optical disc device, in order to observe whether or not focus servo control or tracking servo control is correctly performed, the DSP 412 outputs the focus error signal or the tracking error signal to a serial port 425 according to an instruction of the system controller 424. The output of the serial port 425 is serial-parallel converted by using an instrument 426, which is connected to the optical disc device 400 and is provided only for the optical disc device. The data having been parallel converted is D/A converted by the instrument 426 and is outputted as an analog signal. The analog signal outputted from the instrument 426 is observed by using an oscilloscope 427, so that the focus error signal and the tracking error signal can be observed.

In recent years, as computers increase in computing speed, higher-speed recording and reproduction are demanded from optical disc devices, which are the peripheral devices of the computers. Further, to increase the lives of batteries, lower power consumption is demanded from portable electronic equipment such as a laptop PC, a PDA, a video game machine, and a portable player that have optical disc devices.

Further, efficiency is demanded in development and repair after the shipment of products.

However, according to conventional optical disc devices, low power consumption meeting the above demands is not achieved and a control signal cannot be observed without a special instrument in development and repair after the shipment of products.

An object of the present invention is to provide an optical disc device which can solve the above problems and perform recording and reproduction at high speed with low power consumption. Another object of the present invention is to provide an optical disc device permitting a control signal to be observed with ease in development and repair after the shipment of products.

SUMMARY OF THE INVENTION

An optical disc controller of the present invention servo-controls an optical disc device which comprises a disc motor rotating an optical disc and an optical head emitting a light beam for recording data on the optical disc and/or reproducing data from the optical disc. The optical disc controller comprises: a variable clock output section for outputting a plurality of clock signals of different frequencies, and a control section which receives from the optical head a signal indicating a deviation from a predetermined target value to servo-control the light beam of the optical disc device and performs an operation according to the signal indicating the deviation so as to obtain and output a signal indicating a control amount. The variable clock output section changes a frequency of the clock signal according to a recording speed and/or a reproducing speed when the optical disc device performs recording and/or reproduction, and the control section performs an operation to be performed in synchronization with the clock signal of the variable clock output section.

In one preferred embodiment of the invention, the operation is performed by transmitting the signal indicating the deviation through a filter having a predetermined characteristic, and the characteristic of the filter is varied according to the recording speed and/or the reproducing speed.

In one preferred embodiment of the invention, the characteristic of the filter is determined by a filter coefficient and a frequency of the clock signal, and the filter coefficient is constant regardless of the recording speed and/or the reproducing speed.

According to another aspect of the present invention, an optical disc device for emitting a light beam to an optical disc having a track for recording data, comprises: a converting section which converts, into an electric signal, light reflected from the optical disc or light transmitted through the optical disc, a focus actuator for moving a focus of the light beam perpendicularly to a data surface of the optical disc, a tracking actuator for moving the light beam in a radius direction of the optical disc, a control section which performs an operation according to the electric signal and generates a control signal for controlling the focus actuator so that the light beam keeps a predetermined converging state on the data surface and controlling the tracking actuator so that the light beam is positioned at a center of the track, and a variable clock output section for outputting a plurality of clock signals of different frequencies. The variable clock output section changes a frequency of the clock signal according to a recording speed and/or a reproduction speed when the converting section performs recording and/or reproduction, and the control section performs an operation to be performed in synchronization with the clock signal of the variable clock output section.

In one preferred embodiment of the invention, the optical disc device, further comprises an input/output section which receives the electric signal, converts the signal into a digital signal, outputs the signal to the control section, receives a control signal from the control section, converts the signal into an analog signal, and outputs the signal to the focus actuator and the tracking actuator. The input/output section has a constant operating clock regardless of the recording speed and/or the reproducing speed.

In one preferred embodiment of the invention, the control section generates the control signal by transmitting the electric signal through a filter having a predetermined characteristic, and the characteristic of the filter is varied according to the recording speed and/or the reproducing speed.

In one preferred embodiment of the invention, the characteristic of the filter is determined by a filter coefficient and a frequency of the clock signal, and the filter coefficient is constant regardless of the recording speed and/or the reproducing speed.

According to another aspect of the present invention, a optical disc controller servo-controls an optical head, a disc motor, and a light beam in an optical disc device comprising the disc motor and the optical head, the disc motor rotating an optical disc, the optical head emitting a light beam for recording data on the optical disc and/or reproducing data from the optical disc. The optical disc controller, comprises: an interrupt signal generating section for generating an interrupt signal in each predetermined time period, and a control section which receives an electric signal indicating a current state or a deviation from a target value from the optical head and the disc motor of the optical disc device and performs an operation according to the electric signal so as to obtain and output a control signal indicating a control amount. The control section performs the operation every time the interrupt signal is received from the interrupt signal generating section, and the control section stops operating and goes into a sleep mode at least for a predetermined time period between reception of the interrupt signal and reception of a subsequent interrupt signal.

In one preferred embodiment of the invention, the control section performs the operation every time the interrupt signal is received, and the control section stops operating and goes into the sleep mode from when the operation is completed to when the subsequent interrupt signal is received.

In one preferred embodiment of the invention, the operation includes a disc motor control operation for controlling the disc motor, an operation for focus control of the light beam, an operation for tracking control of the light beam, and an operation for traverse control of the optical head, and the control section, in each of the operations, stops operating and goes into the sleep mode during at least one of the operations.

In one preferred embodiment of the invention, the optical disc controller further comprises an input/output section which receives the electric signal, converts the signal into a digital signal, outputs the signal to the control section, receives a control signal from the control section, converts the signal into an analog signal, and outputs the signal to the optical head and the disc motor. The control section receives the electric signal and outputs the control signal in each of the operations. The control section goes into the sleep mode after performing one of the operations so as to output the control signal to the input/output section, and the control section resumes from the sleep mode after the input/output section receives an electric signal for a subsequent operation and completes conversion to a digital signal.

In one preferred embodiment of the invention, the optical disc controller further comprises an input/output section which receives the electric signal, converts the signal into a digital signal, outputs the signal to the control section, receives a control signal from the control section, converts the signal into an analog signal, and outputs the signal to the optical head and the disc motor, The control section receives the electric signal and outputs the control signal in each of the operations. The control section goes into the sleep mode for a predetermined time period after performing one of the operations so as to output the control signal to the input/output section, and the control section resumes from the sleep mode after a lapse of the predetermined time period.

In one preferred embodiment of the invention, at least a part of the input/output section operates even when the control section is placed into the sleep mode.

According to still another aspect of the present invention, an optical disc device comprises: an optical head which emits a light beam to an optical disc having a track for recording data, the optical head including a converting section which converts, into an electric signal, light reflected from the optical disc or light transmitted through the optical disc, a focus actuator for moving a focus of the light beam perpendicularly to a data surface of the optical disc, and a tracking actuator for moving the light beam in a radius direction of the optical disc, a disc motor for rotating the optical disc, an interrupt signal generating section for generating an interrupt signal in each predetermined time period, and a control section which receives a signal indicating a current state or a deviation from a target value from the optical head and the disc motor and performs an operation according to the electric signal so as to obtain and output a control signal indicating a control amount. The control section performs the operation every time the interrupt signal is received from the interrupt signal generating section, and the control section stops operating and goes into a sleep mode at least for a predetermined time period between reception of the interrupt signal and reception of a subsequent interrupt signal.

In one preferred embodiment of the invention, the control section performs the operation every time the interrupt signal is received, and the control section stops operating and goes into the sleep mode from when the operation is completed to when the subsequent interrupt signal is received.

In one preferred embodiment of the invention, the operation includes a disc motor control operation for controlling the disc motor, an operation for focus control of the light beam, an operation for tracking control of the light beam, and an operation for traverse control of the optical head, and the control section, in each of the operations, stops operating and goes into the sleep mode during at least one of the operations.

In one preferred embodiment of the invention, the optical disc device further comprises an input/output section which receives the electric signal, converts the signal into a digital signal, outputs the signal to the control section, receives a control signal from the control section, converts the signal into an analog signal, and outputs the signal to the optical head and the disc motor. The control section receives the electric signal and outputs the control signal in each of the operations. The control section goes into the sleep mode after performing one of the operations so as to output the control signal to the input/output section, and the control section resumes from the sleep mode after the input/output section receives an electric signal for a subsequent operation and completes conversion into a digital signal.

In one preferred embodiment of the invention, the optical disc device further comprises an input/output section which receives the electric signal, converts the signal into a digital signal, outputs the signal to the control section, receives a control signal from the control section, converts the signal into an analog signal, and outputs the signal to the optical head and the disc motor. The control section receives the electric signal and outputs the control signal in each of the operations. The control section goes into the sleep mode for a predetermined time period after performing one of the operations so as to output the control signal to the input/output section, and the control section resumes from the sleep mode after a lapse of the predetermined time period.

In one preferred embodiment of the invention, at least a part of the input/output section operates even when the control section is placed into the sleep mode.

According to still another aspect of the present invention, an optical disc controller servo-controls an optical disc device comprising a disc motor and an optical head, the disc motor rotating an optical disc, the optical head emitting a light beam for recording data on the optical disc and/or reproducing data from the optical disc. The optical disc controller comprises: a control section which receives an electric signal indicating a current state or a deviation from a target value from the optical head and the disc motor of the optical disc device and performs an operation according to the electric signal so as to obtain and output a control signal indicating a control amount, and an input/output section having a monitor terminal, the input/output section receiving the electric signal to convert the signal into an analog signal from the control section or receiving a control signal from the control section to convert the signal into an analog signal, and outputting the converted signal from the monitor terminal to an outside.

In one preferred embodiment of the invention, the electric signal is a focus error signal or a tracking error signal.

According to still another aspect of the present invention, an optical disc device comprises: a disc motor rotating an optical disc; an optical head emitting a light beam for recording data on the optical disc and/or reproducing data from the optical disc; a control section which receives an electric signal indicating a current state or a deviation from a target value from the optical head and the disc motor of the optical disc device and performs an operation according to the electric signal so as to obtain and output a control signal indicating a control amount, and an input/output section having a monitor terminal, the input/output section receiving the electric signal to convert the signal into an analog signal from the control section or receiving a control signal from the control section to convert the signal into an analog signal, and outputting the converted signal from the monitor terminal to an outside.

In one preferred embodiment of the present invention, the electric signal is a focus error signal or a tracking error signal.

According to the present invention, an operating clock of servo control is changed according to a recording/reproducing speed, thereby reducing power consumption while properly controlling an optical disc device.

Further, according to the present invention, a control section performing an operation for the servo control of an optical head and a disc motor goes into a sleep mode for a time period during which any operation is not performed in one sampling period. Hence, it is possible to reduce the power consumption of the control section.

Moreover, according to the present invention, since a servo controller in the optical disc device of the present invention directly outputs a focus error signal or a tracking error signal as an analog signal from a D/A converter to an optical disc controller, a signal can be observed without the necessity for a special instrument, increasing the efficiency of development and repair.

BRIEF DESCRIPTION OF THE DRAWINGS

FIG. 2 is a diagram showing the timing of control in a DSP of the optical disc device shown in FIG. 1.

DETAILED DESCRIPTION OF THE PREFERRED EMBODIMENTS

Embodiment 1

Figure 1:
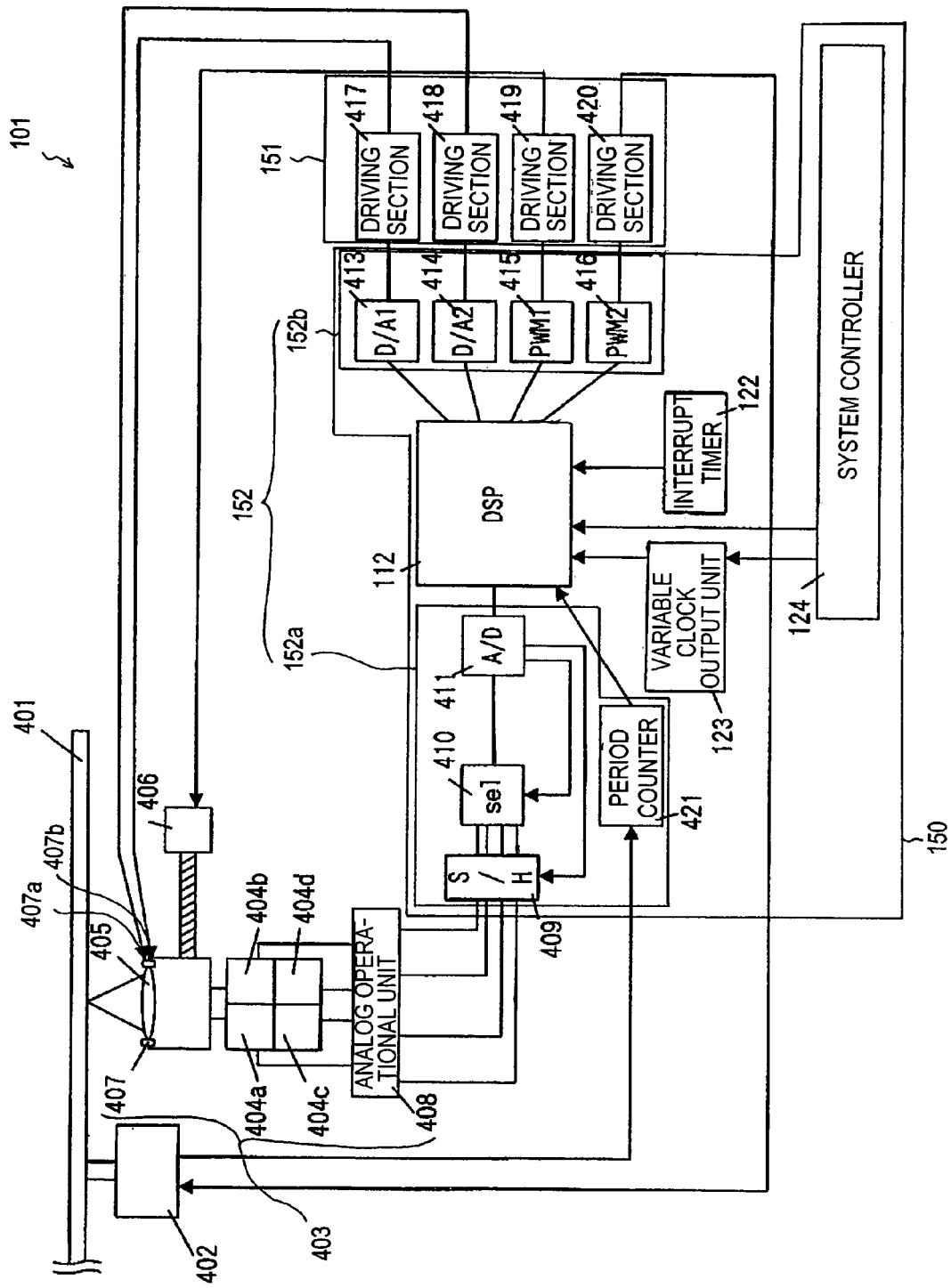
FIG. 1 is a block diagram showing Embodiment 1 of an optical disc device according to the present invention.

In an optical disc device, a DSP for servo-controlling the converging lens of an optical head, a disc motor, a traverse motor, and so on is required to operate on a operating clock of a high frequency, in order to perform recording and reproduction at high speed. In a conventional optical disc device for a high-speed operation, a DSP has a fixed operating clock. Thus, even in a low-speed operation, the DSP operates on an operating clock of a high frequency. For this reason, even in a low-speed operation, the DSP unnecessarily operates at high speed, increasing excessive power consumption. The present embodiment reduces power consumption during recording and reproduction performed at low speed.

The following will describe Embodiment 1 of an optical disc device and an optical disc controller according to the present invention. An optical disc device 101 of FIG. 1 comprises a disc motor 402 which is loaded with an optical disc 401 and rotates the optical disc 401, an optical head 403, an optical disc processor (hereinafter, abbreviated as ODC) 150, and a driving section 151.

The optical head 403 includes a light source (not shown) for emitting a light beam, a converging lens 405 for converging a light beam, a focus actuator 407a which moves the converging lens 405 along the perpendicular direction to the data surface of the optical disc 401 so as to move the focus of a light beam along the direction, a tracking actuator 407b which moves the converging lens 405 along the radius direction of the optical disc 401 so as to move the focus of a light beam along the radius direction, a detector 404, and an analog operational unit 408. In the optical head 403, the light source, the converging lens 405, and the photodetector 404 constitute a converging section. The light source and the converging lens 405 emit a light beam converging on the recording surface of the optical disc 401, and the photodetector 404 detects the reflected light or transmitted light of the light beam and converts the light into an electric signal. As shown in FIG. 1, the photodetector 404 is divided into areas 404a and 404c and areas 404b and 404d along the tangential direction of tracks and is divided into the areas 404a and 404b and the areas 404c and 404d along the perpendicular direction of the tracks. Namely, the detection area of the photodetector 404 is divided into four.

The converging lens 405 mounted on the optical head 403 is driven by the focus actuator 407a and the tracking actuator 407b along a focusing direction, which is perpendicular to the recording surface of the optical disc 401, and the radius direction of the optical disc 401. The whole optical head 403 can be moved in the radius direction of the optical disc 401 by a traverse motor 406.

The analog operational unit 408 receives the output of the photodetector 404 and outputs an FE+ signal and an FE– signal. By computing a difference between the FE+ signal and the FE– signal, a focus error signal can be obtained which indicates a deviation between the focus of a light beam and the information recording surface. For example, when the focus error signal is obtained by the astigmatic method, the FE+ signal is generated from an added signal of the photodetectors 404a and 404d and the FE– signal is generated from an added signal of the photodetectors 404b and 404c.

The ODC 150 includes a DSP 112, an input/output section 152, a period counter 421, a variable clock output unit 123, an interrupt timer 122, and a system controller 124. The input/output section 152 is constituted of an input section 152a and an output section 152b. The input section 152a includes a sample hold section 409, a selector 410, and an A/D converter 411. Further, the output section 152b includes D/A converters 413 and 414 and PWM converters 415 and 416.

The ODC 150 may further include a circuit for the binarization and decoding of a reproduction signal obtained from the optical disc, a circuit for encoding data to be recorded, and a port for the transmission and reception of an obtained signal to and from a host computer (these circuits and port are not shown in FIG. 1). Further, each of these functional sections or units constituting the ODC 150 may be realized by software stored in an LSI and memories such as an RAM, or each ach of these functional sections or units embers may be realized with a hardware circuit using a semiconductor technology. The combination of software and hardware is also applicable. Moreover, the system controller 124, the period counter 421 and the input/output section 152 may not be included in the ODC 150 but may be constituted as separate chips.

As will be discussed in detail below, the DSP 112 operates according to the output clock of the variable clock output unit 123 and performs the following operation according to the output of the interrupt timer 122 shown in FIG. 2(A).

First, the DSP 112 starts, from time D1, an operation for controlling the disc motor (indicated by DM in FIG. 2(I)). The disc motor 402 outputs an FG signal according to a rotational period, and the period of the FG signal is counted by a period counter 421. According to an instruction of a system controller 424, the DSP 112 performs a digital filtering operation on a difference between the output of the period counter 421 and a disc motor rotation target RAM according to a disc motor filter coefficient set for the RAM (not shown) of the DSP 112, and the DSP 112 outputs an arithmetic result, as a control signal for driving the disc motor 402, to a PWM converter 416 at the timing of FIG. 2(M). The PWM converter 416 receives the control signal, performs pulse width modulation thereon, and outputs the signal to a driving circuit 420. The driving circuit 420 performs power amplification on the received signal and supplies the signal to the traverse motor 402. Thus, control is performed so that the revolution speed of the disc motor 402 is set at a predetermined value.

At this point, as shown in FIG. 2(B), the A/D converter 411 transmits an S/H signal to the sample hold circuit 409 in parallel with the above-explained processing and the A/D converter 411 samples and holds the FE+ signal a n d the FE– signal at time S1. Further, as shown in FIG. 2(C), the A/D converter 411 transmits a control signal so that the selector 410 outputs the FE+ signal at time S1. As shown in FIG. 2(D), the A/D converter 411 performs A/D conversion. As shown in FIG. 2(E), the A/D converter 411 obtains an A/D converted value (FE+ converted value) by converting the FE+ signal to a digital signal. Further, the A/D converter 411 transmits a control signal to the selector 410 so that the selector 410 outputs an FE– signal at time S2. As shown in FIG. 2(D), the A/D converter 411 performs A/D conversion and obtains an A/D converted value (FE– converted value) by converting the FE– signal of FIG. 2(F) into a digital signal.

As shown in FIG. 2(I), the DSP 112 starts an operation for focus control (indicated by Fc in FIG. 2(I)) from time D2. The DSP 112 computes a difference between the FE+ signal (FE+ converted value) and the FE– signal (FE– converted value) that have been converted into digital values by the A/D converter 411 and the DSP 112 obtains a focus error signal. According to an instruction of the system controller 424, the DSP 112 performs a digital filtering operation on the focus error signal according to a focus filter coefficient set for the RAM (not shown) of the DSP 112 and outputs an arithmetic result, as a control signal for driving the focusing coil of the actuator 407, to the D/A converter 413 at the timing of FIG. 2(J). The D/A converter 413 converts the output of the DSP 112 into an analog value and outputs the value to a driving circuit 417. The driving circuit 417 performs power amplification on the analog control signal and supplies the signal to the focusing coil of the actuator 407. Thus, control is performed so as to position the convergent point of a light beam on the information recording surface of the optical disc 401.

Moreover, the output of the photodetector 404 is inputted to the analog operational unit 408, and the analog operational unit 408 outputs a TE+ signal and a TE– signal. By computing a difference between the TE+ signal and the TE– signal, a tracking error signal can be obtained which indicates a displacement between the focus of a light beam and a track. For example, when the tracking error signal is obtained by the push-pull method, the TE+ signal is an added signal of signals from the photodetectors 404a and 404c and the TE– signal is an added signal of signals from the photodetectors 404b and 404d.

The A/D converter 411 transmits a control signal to the sample hold circuit 409 so as to sample and hold the TE+ signal and the TE– signal at time S3. Further, the A/D converter 411 transmits a control signal to the selector 410 so as to output the TE+ signal at time S3. As shown in FIG. 2(G), the A/D converter 411 performs A/D conversion to obtains an A/D converted value (TE+ converted value), which is a digital signal of the TE+ signal. Moreover, the A/D converter 411 transmits a control signal to the selector 410 so as to output the TE– signal at time S4. As shown in FIG. 2(H), the A/D converter 411 performs A/D conversion to obtain an A/D converted value (TE– converted value), which is a digital signal of the TE– signal.

The DSP 112 starts an operation for tracking control (indicated by Tk in FIG. 2(I)) from time D3. The DSP 112 computes a difference between the TE+ signal (TE+ converted value) and the TE– signal (TE– converted signal) that have been converted into digital values by the A/D converter 411 and the DSP 112 obtains a tracking error signal. According to an instruction of the system controller 424, the DSP 112 performs a digital filtering operation on the tracking error signal according to a tracking filter coefficient set for the RAM (not shown) of the DSP 412 and outputs an arithmetic result, as a control signal for driving the tracking coil of the actuator 407, to the D/A converter 414 at the timing of FIG. 2(K). The D/A converter 414 converts the output of the DSP 112 into an analog value and outputs the value to a driving circuit 418. The driving circuit 418 performs power amplification on the analog control signal and supplies the signal to the tracking coil of the actuator 407. Control is performed so as to position the convergent point of a light beam at the center of the tracks of the optical disc 401.

Further, the DSP 112 starts an operation for traverse control (indicated by TRS in FIG. 2(I)) from time D4. According to an instruction of the system controller 424, the DSP 112 performs a digital filtering operation on the tracking error signal according to a traverse filter coefficient set for the RAM (not shown) of the DSP 112 and the DSP 112 outputs an arithmetic result, as a control signal for driving the traverse motor 406, to the PWM converter 415 at the timing of FIG. 2(L). The PWM converter 415 receives the control signal, performs pulse width modulation thereon, and outputs the signal to the driving circuit 419. The driving circuit 419 performs power amplifier on the received signal and supplies the signal to the traverse motor 406. Hence, the position of the optical head 403 is controlled to position the convergent point of a light beam at the center of the tracks of the disc 401.

The DSP 112 waits from time D5 indicating the completion of the traverse control operation (TRS) to time D6 indicating the subsequent output of the interrupt timer 422. When the subsequent output is made from the interrupt timer 422, the above-described servo control steps are performed and repeated for each output of the interrupt timer 422.

The optical disc device 101 and the ODC 150 are adapted for high-speed recording and/or reproduction. When recording and reproducing speeds are changed, the system controller 124 transmits a signal to the variable clock output unit 123 to change the frequency of a clock to be outputted. For example, when the optical disc 101 and the ODC 150 are adapted for one-time speed (1×), eight-times speed (8×), and sixteen-times speed (16×), the recording/reproducing speed is switched to one-time speed (1×), an eight-times speed (8×), and a sixteen-times speed (16×), so that the variable clock output unit 123 generates clock signals having frequencies of 6.25 MHz, 50 MHz, and 100 MHz. When servo control is performed at each recording/reproducing speed, the DSP performs control according to the clock signals having frequencies of 6.25 MHz, 50 MHz, and 100 MHz. While the number of instructions performed in one sample period is not changed, the time of the whole sample period is changed according to the frequency of a clock signal. Since a frequency and power consumption generally have a proportional relationship, the power consumption of the ODC 150 can be made lower by reducing the frequency of the clock signal during a low-speed operation.

At this point, the A/D converter 411, the D/A converters 413 and 414, the PWM converters 415 and 416, and the period counter 421 may have constant operating clocks regardless of recording/reproducing speeds and the operating clocks may be different from an operating clock outputted from the variable clock output unit 123 to the DSP 112.

Referring to FIG. 3, the following will describe the characteristics of the focus filter, the tracking filter, the disc motor filter, and the traverse filter that are used in the operations of the DSP 112. The real-time characteristics of the digital filters that are computed by the DSP 112 are determined by a digital filter coefficient and an operating clock signal frequency, which is an operation period.

Figure 3A:
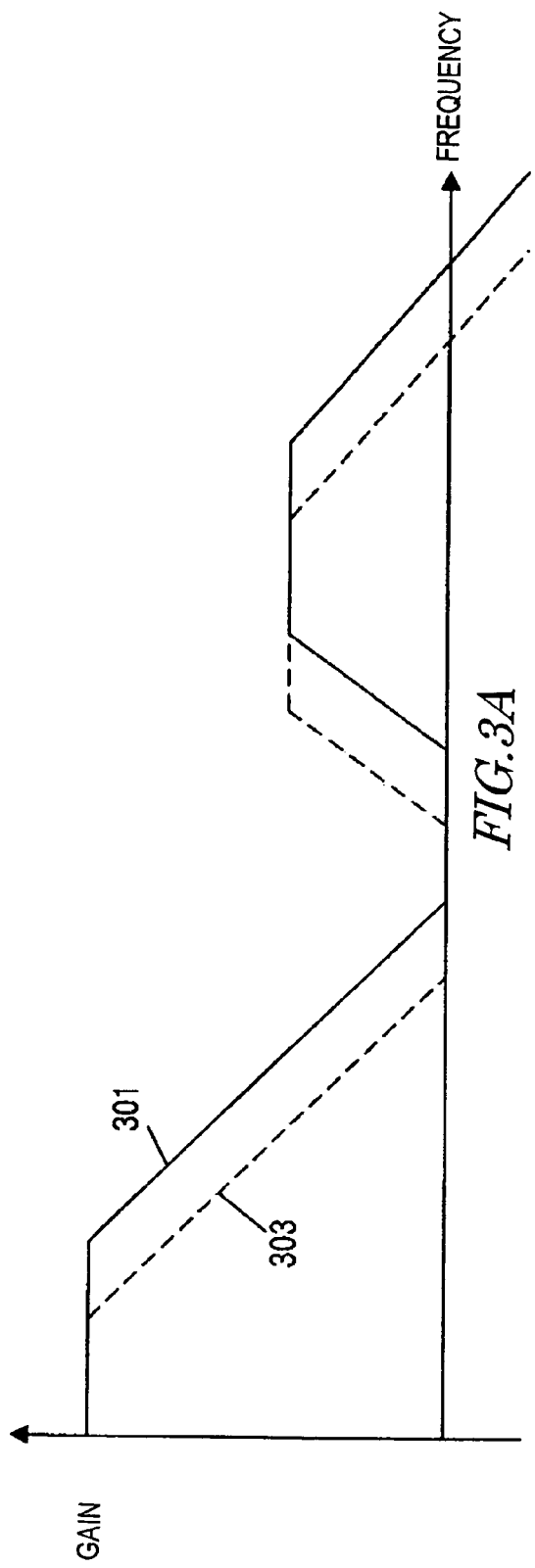
FIGS. 3A and 3B are graphs showing an example of the characteristics of a digital filter which is used in the DSP of the optical disc device shown in FIG. 1.
Figure 3B:
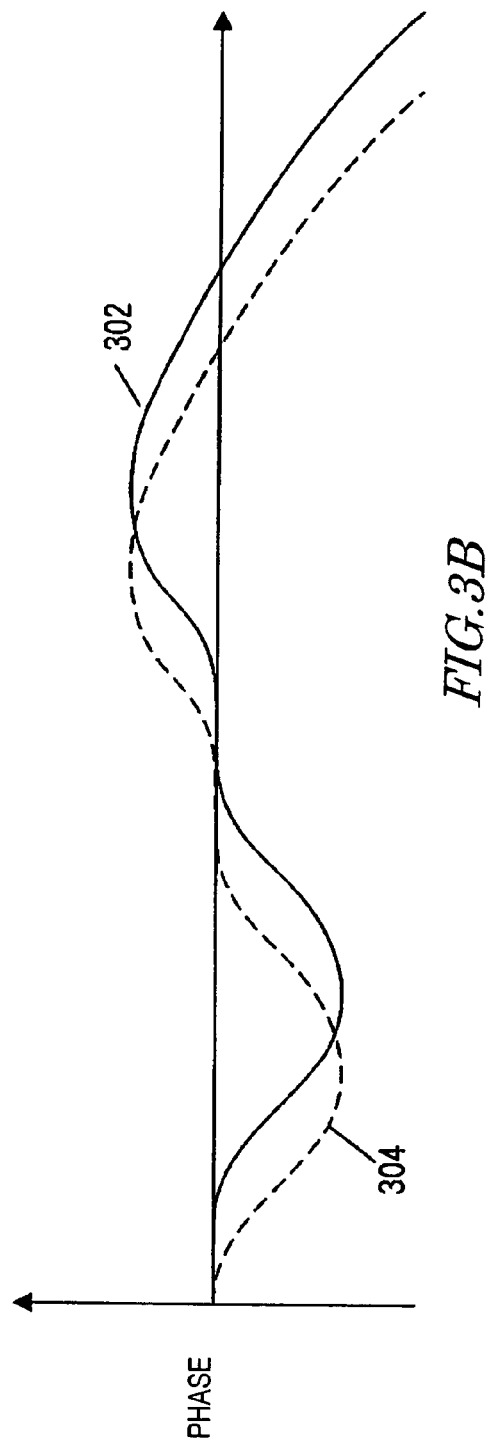

When the output clock from the variable clock output unit 123 has a frequency of fa, for example, it is assumed that the focus filter has a gain characteristic and a phase characteristic indicated by lines 301 and 302 of FIGS. 3A and 3B. When the frequency of the output clock from the variable clock output unit 123 decreases to fb, which is lower than fa, in response to a signal from the system controller 124, the gain characteristic and phase characteristic of the focus filter also shift to the lower-frequency side due to the decrease in frequency of the operating clock. Thus, without changing the digital filter coefficient of the DSP 112, the gain characteristic and phase characteristic are shifted to the lower-frequency side as indicated by the broken lines of FIGS. 3A and 3B. During low-speed recording and reproduction, a focus servo system, a tracking servo system, a disc motor system, and a traverse servo system are all reduced in disturbance frequency. Thus, the filter characteristics used to perform an operation for controlling the systems can be shifted to a lower side.

Namely, although the focus filter, the tracking filter, the disc motor filter, and the traverse filter are equal in coefficient regardless of a recording/reproducing speed, since an operating clock signal inputted to the DSP changes in frequency according to a change in recording/reproducing speed, the filter characteristics can be properly changed according to a change in recording/reproducing speed. Therefore, it is not necessary to store a filter coefficient for each recording/reproducing speed, reducing the capacity of a memory for storing the filter coefficients.

Further, in the present embodiment, the filter characteristics are varied by changing the output clock frequency of the variable clock output unit 123. In the case where the variable clock output unit 123 has a large set unit of an output clock frequency and a filter coefficient is made constant, when desired digital filter characteristics cannot be obtained, an output clock frequency from the system controller 124 to the variable clock output unit 123 and the digital filter coefficient of the DSP 112 may be changed to produce desired digital filter characteristics. Also in this case, an output clock frequency is changed according to a recording/reproducing speed, thereby reducing the power consumption of the ODC 150.

Embodiment 2

Figure 8:
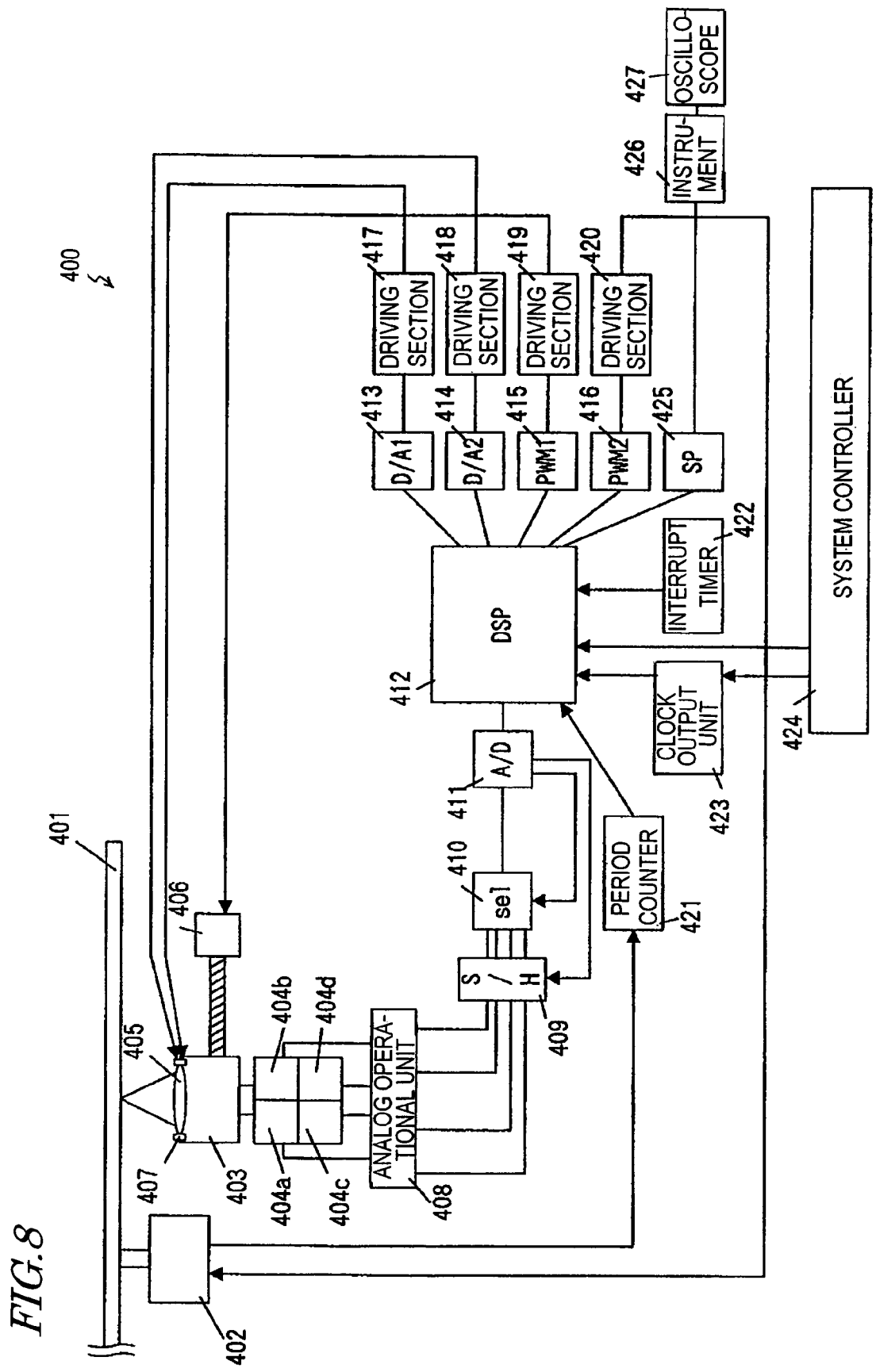
FIG. 8 is a block diagram showing a conventional optical disc device.
Figure 9:
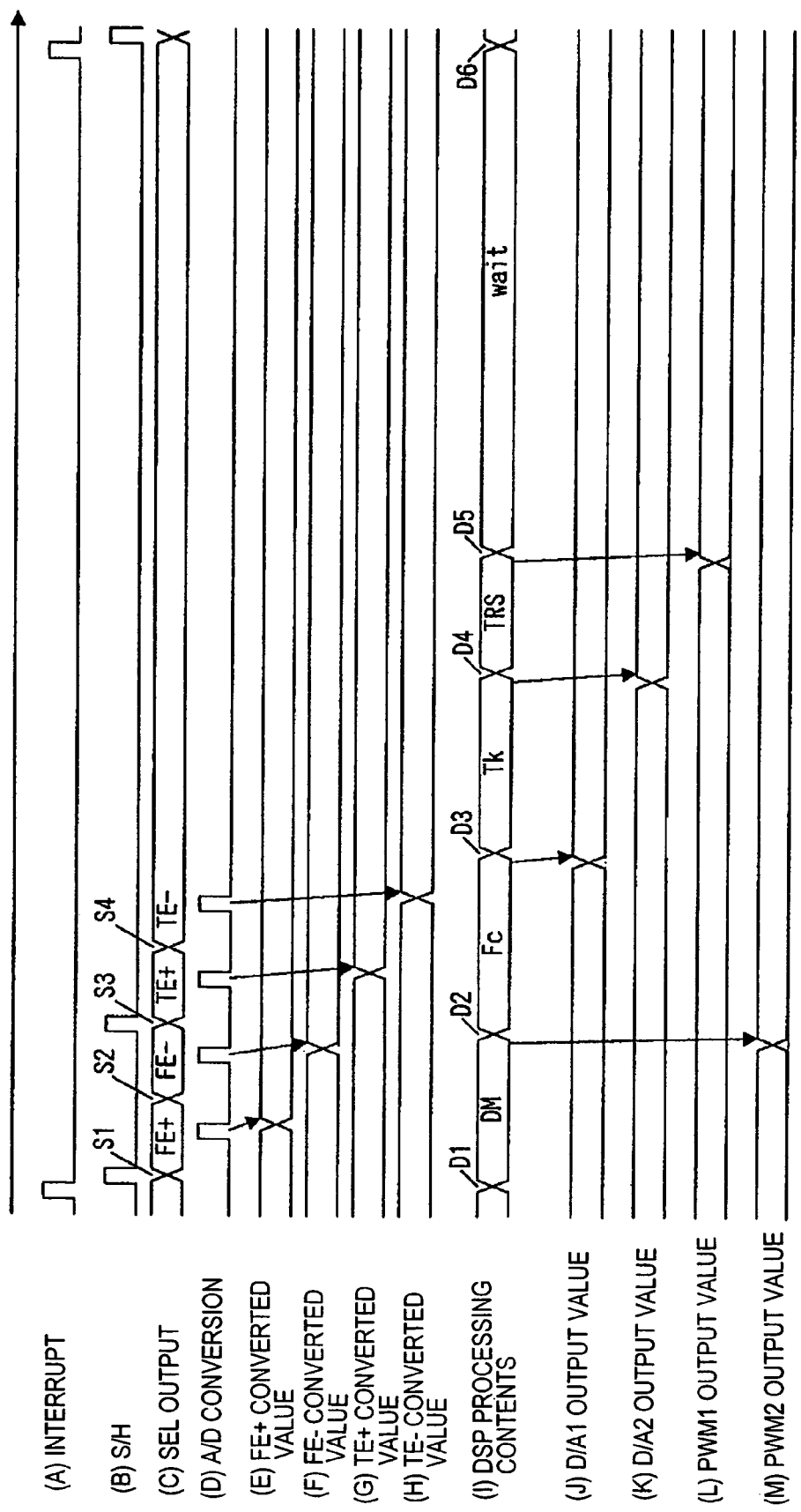
FIG. 9 is a diagram showing the timing of control in the DSP of the conventional optical disc device.

In the conventional optical disc device of FIG. 8, the total time of operations to be performed by the DSP 412 in one sampling period is shorter than one sampling period. Thus, in the conventional optical disc device, as shown in FIG. 9(i), the DSP 412 enters a waiting state after the completion of operations. However, the DSP 412 causes high power consumption even in the waiting state. The present embodiment reduces power consumption in a period during which no operation is performed by the DSP.

The following will describe Embodiment 2 of an optical disc device and an optical disc controller according to the present invention. An optical disc device 102 of FIG. 4 comprises a disc motor 402 which is loaded with an optical disc 401 and rotates the optical disc, an optical head 403, an ODC 160, and a driving section 151.

For example, the disc motor 402, the optical head 403, and the driving section 151 are configured like Embodiment 1 and are operated as Embodiment 1.

The ODC 160 includes a DSP 162, an input/output section 152, a period counter 421, a clock output unit 161, an interrupt timer 163, and a system controller 124. For example, the input/output section 152 and the period counter 421 are configured like Embodiment 1 and function as those of Embodiment 1.

The clock output unit 161, as will be described later, stops outputting a clock signal to the DSP 162 when receiving an operation completion signal indicating the completion of operations to be performed in one sampling period. Further, when the clock output unit 161 starts outputting a clock signal to the DSP 162 when receiving an interrupt signal from the interrupt timer 163. When the supply of a clock signal is stopped, the DSP 162 goes into a sleep mode to stop operations. Hence, it is possible to reduce power consumption in a period during which no operation is performed by the DSP 162.

Figure 5:
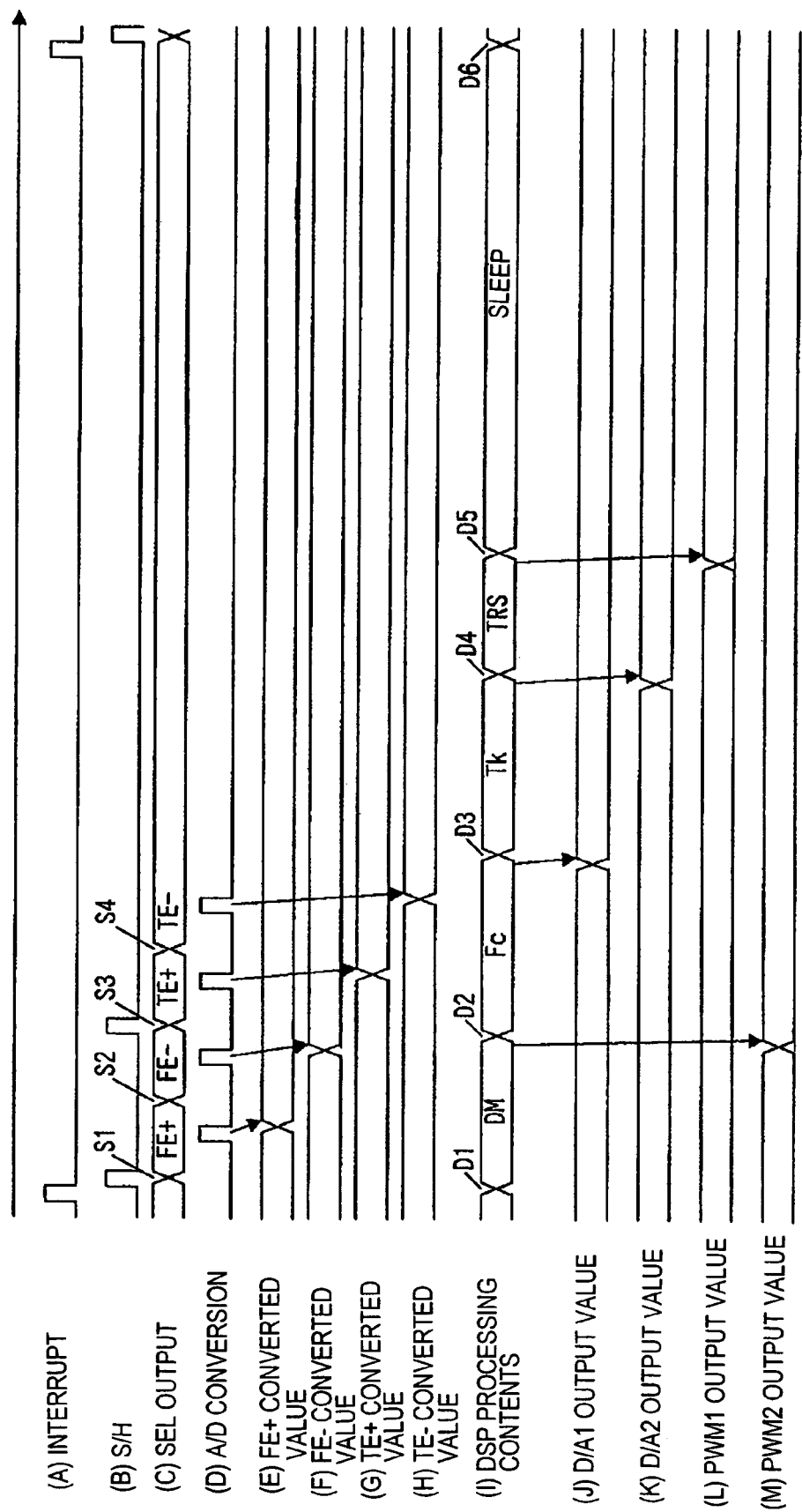
FIG. 5 is diagram showing the timing of control in a DSP of the optical disc device shown in FIG. 4.

The servo control operation of the optical disc device 102 will be described below. FIG. 5 shows control performed by the ODC 160 of the optical disc device 102 in one sampling period. When the interrupt timer 163 outputs an interrupt signal to the DSP and the clock output unit 161, the DSP 162 resumes from the sleep mode and starts an operation for disc motor control from time D1.

Regarding the disc motor control operation from time D1, a focus control operation from time D2, a tracking control operation from time D3, and a traverse control operation from time D4 that are performed by the DSP 162, the specific steps are the same as Embodiment 1.

When the traverse control operation (TRS) is completed, the DSP 162 outputs an arithmetic result to a PWM converter 416 at time D5. Further, the DSP 162 outputs an operation completion signal to the clock output unit 161.

The clock output unit 161 stops generating a clock signal when receiving the operation completion signal. Thus, the DSP 162 stops its operations and goes into the sleep mode. In the sleep mode, the DSP 162 is stopped and is reduced in power consumption to 0 or almost 0. At this point, the input/output section 152 and the driving section 151 continue its operations.

When the interrupt timer 163 outputs the subsequent interrupt signal to the DSP 162 and the clock output unit 161, the clock output unit 161 outputs a clock signal to the DSP 162 again. Hence, the DSP 163 resumes from the sleep mode and restarts its operation.

According to the present embodiment, the DSP 162 stops its operation in a period during which no arithmetic operation is performed. Therefore, it is possible to eliminate power consumption in the period, reducing the power consumption of the ODC 160.

Figure 4:
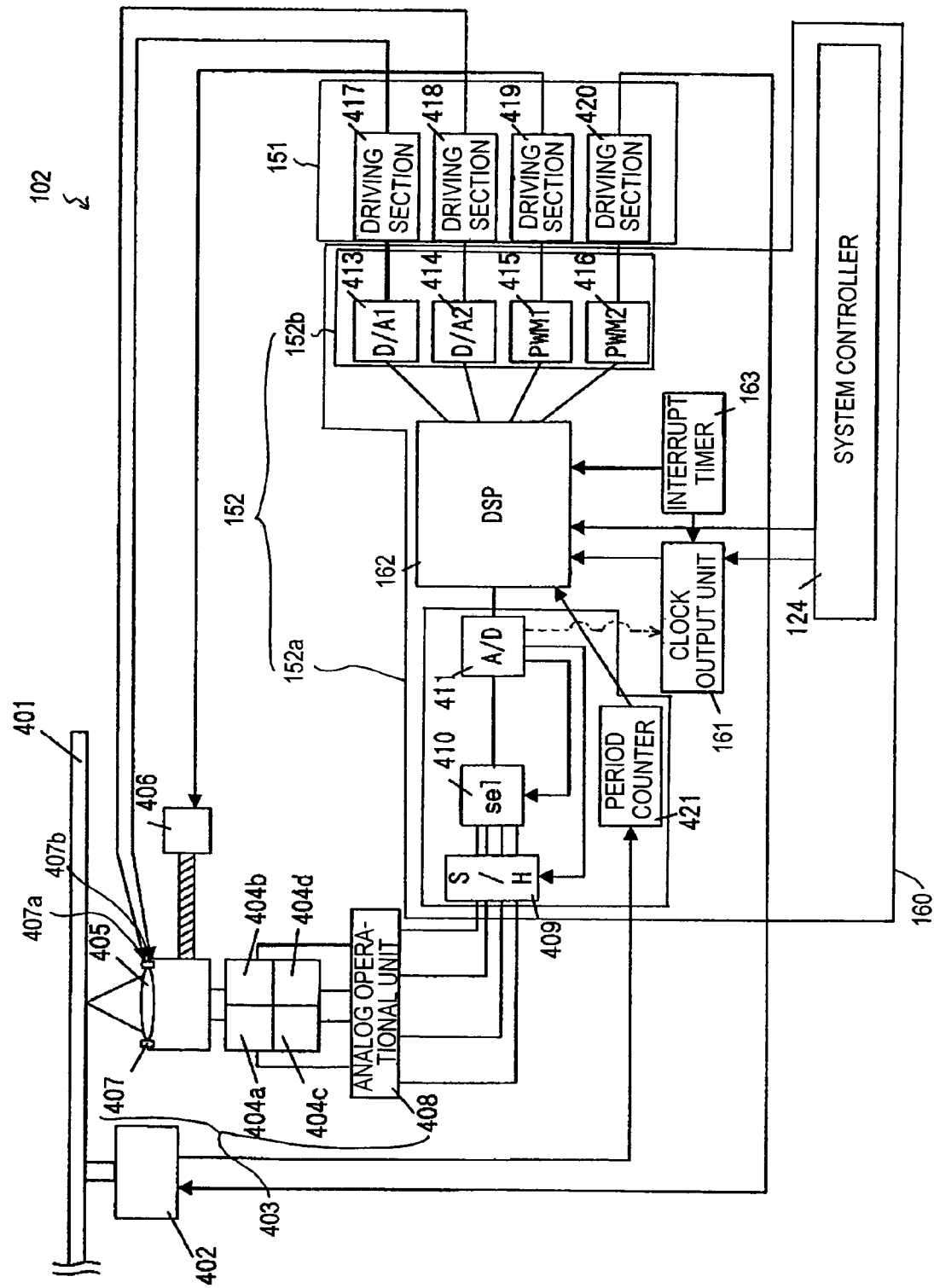
FIG. 4 is a block diagram showing Embodiment 2 of the optical disc device according to the present invention.

In the above example, the DSP goes into the sleep mode after the completion of all operations to be performed in one sampling period. The sleep mode may be provided between the operations. In order to provide such a sleep mode, as shown in FIG. 4, an A/D converter 411 is caused to generate an A/D conversion completion signal indicating the completion of A/D conversion and output the signal to the clock output unit 161.

When a signal is outputted from the A/D converter 411 to the DSP 162, the A/D conversion completion signal may be generated several clocks before the completion of A/D conversion so as to generate the DSP 162.

Figure 6:
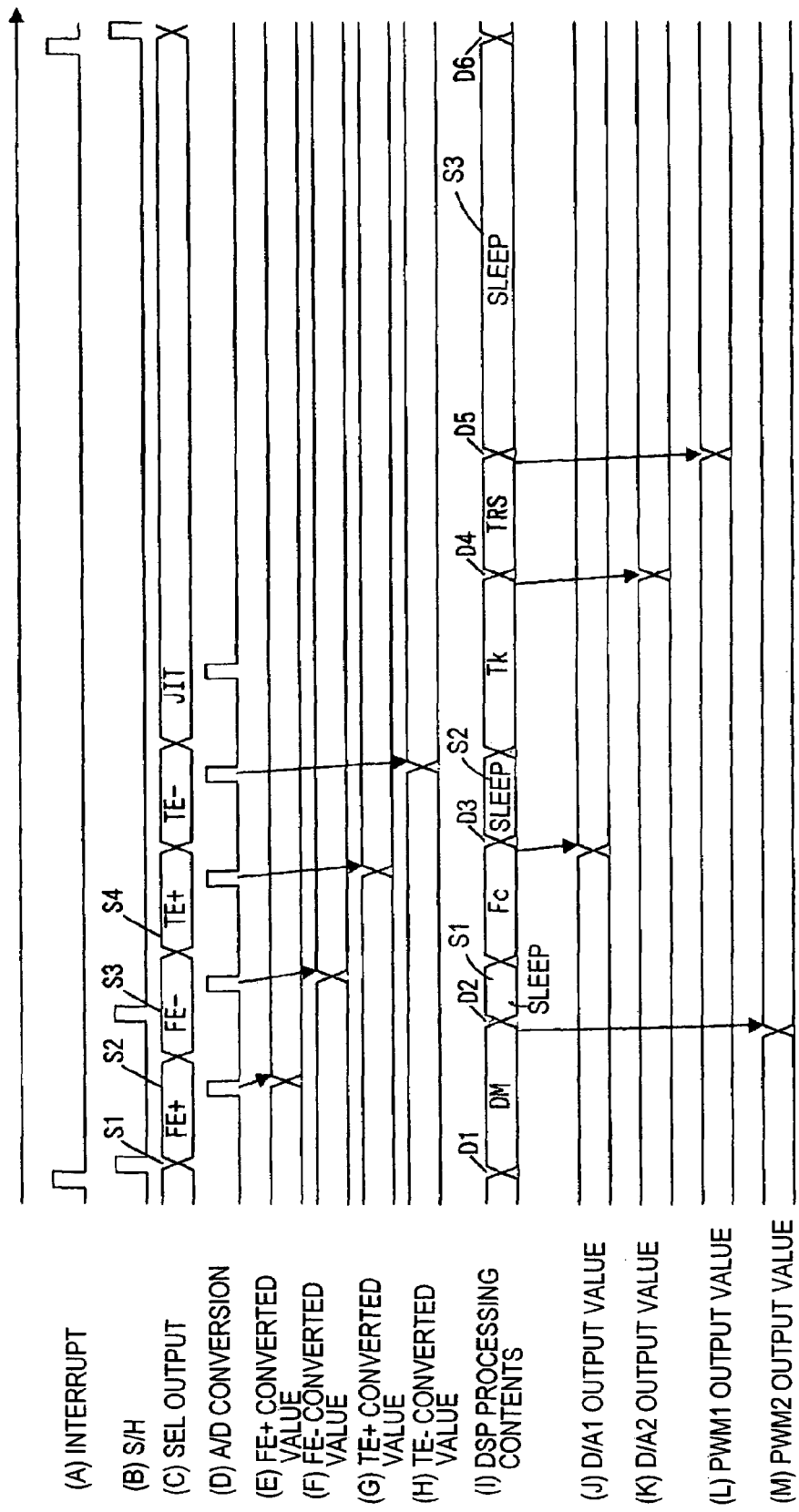
FIG. 6 is a diagram showing another timing of control in the DSP of the optical disc device shown in FIG. 4.

As shown in FIG. 6, for example, after the completion of the disc motor control operation (DM), the DSP 162 outputs a control signal serving as an arithmetic result to the PWM converter 416 at time D2. At this point, the DSP 162 outputs an operation completion signal to the clock output unit 161. The clock output unit 161 suspends the output of a clock signal according to the operation completion signal. Thus, the DSP 162 is placed into a sleep mode S1. At this point, the input/output section 150 is operated and A/D converts an FE- signal. The A/D converter 411 outputs the A/D conversion completion signal to the clock output unit 161 at the completion of the A/D conversion. Thus, the clock output unit 161 starts outputting a clock signal and the DSP 162 resumes from the sleep mode according to the received clock signal.

Moreover, after the completion of a focus control operation (Fc), the DSP 162 outputs a focus control signal serving as an arithmetic result to a D/A converter 413 at time D3. At this point, the DSP 162 outputs an operation completion signal to the clock output unit 161. The clock output unit 161 suspends the output of a clock signal according to the operation completion signal. Hence, the DSP 162 is placed into a sleep mode S2. At this point, the input/output section 150 operates and A/D converts a TE- signal. The A/D converter 411 outputs an A/D conversion completion signal to the clock output unit 161 at the completion of the A/D conversion. Thus, the clock output unit 161 starts outputting a clock signal and the DSP 162 resumes from the sleep mode according to the received clock signal.

When the traverse motor control operation is completed, as described above, the clock output unit 161 stops outputting a clock signal according to the operation completion signal and the DSP 162 is placed into a sleep mode S3. The DSP 162 resumes from the sleep mode according to the output of the interrupt timer 163.

In addition to the above example, the DSP 162 may be caused to resume from the sleep mode by specifying the period of the sleep mode. For example, the clock output unit 161 may stop outputting a clock signal according to the operation completion signal of the DSP 162 and restart outputting a clock signal after a lapse of a certain time period.

The above explanation described the servo control operation in a steady state, in which the optical disc device 102 records or reproduces data on the optical disc. When the optical disc device 102 is in a steady state, longer time can be used for the sleep mode in one sample period. In a period other than the steady state, for example, during learning for setting a parameter for recording data on the optical disc and during searching, a sleep mode can be provided when no operation is performed by the DSP 162.

Embodiment 3

The present embodiment will describe an optical disc device permitting a control signal to be observed with ease during development and repair after the shipment of products.

Figure 7:
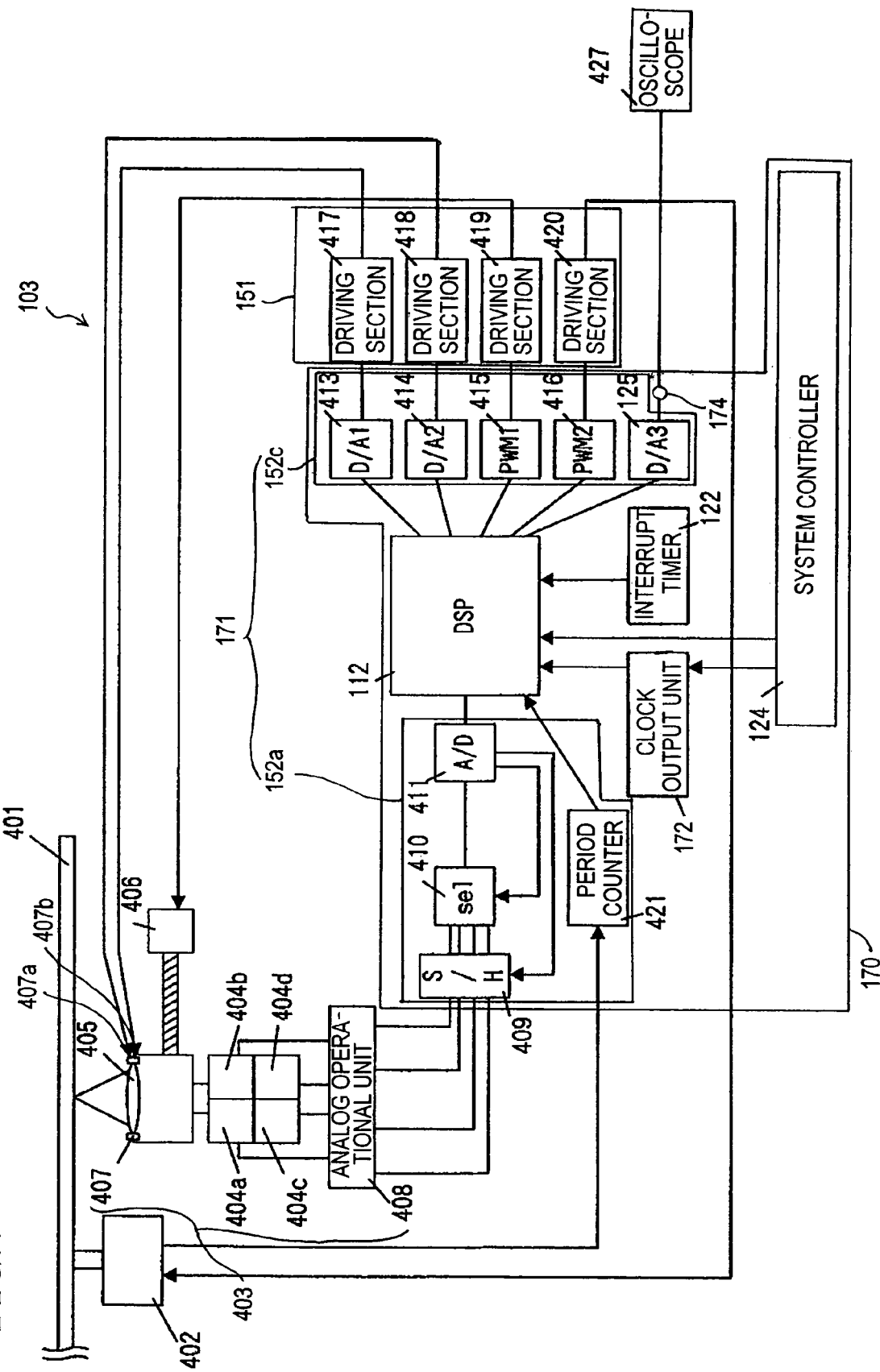
FIG. 7 is a block diagram showing Embodiment 3 of an optical disc device according to the present invention.

The following will describe Embodiment 3 of the optical disc device and an optical disc controller according to the present invention. An optical disc device 103 of FIG. 7 comprises a disc motor 402 which is loaded with an optical disc 401 and rotates the optical disc, an optical head 403, an ODC 170, and a driving section 151.

For example, the disc motor 402, the optical head 403, and the driving section 151 are constituted as those of Embodiment 1 and are operated as Embodiment 1.

The ODC 170 includes a DSP 112, an input/output section 171, a period counter 421, a clock output unit 172, an interrupt timer 122, and a system controller 124. The DSP 112, the period counter 421, the interrupt timer 122, and the system controller 124 are operated as Embodiment 1. The frequency of a clock signal is fixed in the clock output unit 172.

The input/output section 171 is constituted of an input section 152a and an output section 152c. The input section 152a is also configured as that of Embodiment 1.

The output section 152c comprises a D/A converter 125 in addition to D/A converters 413 and 414 and PWM converters 415 and 416. The D/A converter 125 comprises a monitor output terminal 174 for making electrical connection with the outside of the ODC 170.

The ODC 170 can D/A convert, according to an instruction to the system controller 124, a focus control signal or tracking control signal obtained by the DSP 112 of the ODC 170 or a focus error signal or tracking error signal inputted from an A/D converter 411 before the DSP 112 performs an operation, and the ODC 170 can output an analog signal from the monitor output terminal 174.

According to the optical disc device 103, without the necessity for a special instrument, a focus error signal or a tracking error signal can be observed by connecting the monitor output terminal 174 of the D/A converter 125 directly to an oscilloscope 427. Thus, development can be made more efficient and the optical disc device 103 can be reduced in repair time.

In Embodiment 2, the clock output unit outputs a clock signal of a constant frequency. As described in Embodiment 1, the variable clock output unit may be used for the optical disc device or the ODC of Embodiment 2. Further, the D/A converter 125 and the monitor output terminal 174 that are described in Embodiment 3 may be provided in the optical disc device or the ODC of Embodiment 1 or Embodiment 2.

As explained in detail through Embodiments 1 to 4, according to the present invention, it is possible to achieve an ODC of low power consumption and an optical disc device having the ODC. Thus, the present invention can be suitably adopted for portable electronic equipment such as a laptop PC, a PDA, a video game machine, and a portable player that have optical disc devices, increasing the lives of batteries in such portable electronic equipment.

Moreover, the present invention achieves simple maintenance and repair for an optical disc device or equipment having the optical disc device.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disc controller for servo-controlling an optical head, a disc motor, and a light beam in an optical disc device comprising the disc motor and the optical head, the disc motor rotating an optical disc, the optical head emitting a light beam for recording data on the optical disc and/or reproducing data from the optical disc, the optical disc controller, comprising:
  an interrupt signal generating section for generating an interrupt signal in each one of a plurality of predetermined time periods, and
  a control section which receives a digital signal indicating a current state or a deviation from a target value from the optical head and the disc motor of the optical disc device and performs a plurality of operations according to the digital signal so as to obtain and output a control signal indicating a control amount, and
  an input/output section which receives an electric signal, converts the electric signal into the digital signal, outputs the digital signal to the control section, receives a control signal from the control section, converts the control signal into an analog signal, and outputs the analog signal to the optical head and the disc motor, wherein
  (a) the control section performs the plurality of operations every time the interrupt signal is received from the interrupt signal generating section,
  (b) the control section stops operating and goes into a sleep mode at least for a predetermined time period between reception of the interrupt signal and reception of a subsequent interrupt signal,
  (c) the control section receives the digital signal and outputs the control signal for each of the operations,
  (d) the control section goes into the sleep mode after performing one of the operations, and
  (e) the control section resumes operation from the sleep mode several clocks before completion of conversion of the electric signal to the digital signal after the input/output section receives the electric signal for a subsequent operation.

2. An optical disc controller for servo-controlling an optical head, a disc motor, and a light beam in an optical disc device comprising the disc motor and the optical head, the disc motor rotating an optical disc, the optical head emitting a light beam for recording data on the optical disc and/or reproducing data from the optical disc, the optical disc controller, comprising:
  an interrupt signal generating section for generating an interrupt signal in each of a plurality of first predetermined time periods, and
  a control section which receives digital signal indicating a current state or a deviation from a target value from the optical head and the disc motor of the optical disc device and performs a plurality of operations according to the digital signal so as to obtain and output a control signal indicating a control amount, and
  an input/output section which receives an electric signal, converts the electric signal into the digital signal, outputs the digital signal to the control section, receives a control signal from the control section, converts the control signal into an analog signal, and outputs the analog signal to the optical head and the disc motor, wherein
  (a) the control section performs the plurality of operations every time the interrupt signal is received from the interrupt signal generating section,
  (b) the control section stops operating and goes into a sleep mode at least for a predetermined time period between reception of the interrupt signal and reception of a subsequent interrupt signal,
  (c) the control section receives the digital signal and outputs the control signal for each of the operations,
  (d) the control section goes into the sleep mode for a second predetermined time period after performing one of the operations so as to output the control signal to the input/output section, and
  (e) the control section resumes operation from the sleep mode after a lapse of the second predetermined time period.

3. An optical disc device, comprising:
  an optical head which emits a light beam to an optical disc having a track for recording data, the optical head including a converting section which converts, into an electric signal, light reflected from the optical disc or light transmitted through the optical disc, a focus actuator for moving a focus of the light beam perpendicularly to a data surface of the optical disc, and a tracking actuator for moving the light beam in a radius direction of the optical disc,
  a disc motor for rotating the optical disc, an interrupt signal generating section for generating an interrupt signal in each of a plurality of predetermined time periods, and a control section which receives a digital signal indicating a current state or a deviation from a target value from the optical head and the disc motor and performs an operation according to the digital signal so as to obtain and output a control signal indicating a control amount, and an input/output section which receives an electric signal, converts the electric signal into a digital signal, outputs the digital signal to the control section, receives a control signal from the control section, converts the control signal into an analog signal, and outputs the analog signal to the optical head and the disc motor, wherein (a) the control section performs the plurality of operations every time the interrupt signal is received from the interrupt signal generating section, (b) the control section stops operating and goes into a sleep mode at least for a predetermined time period between reception of the interrupt signal and reception of a subsequent interrupt signal, (c) the control section receives the electric signal and outputs the control signal in each of the operations, (d) the control section goes into the sleep mode after performing one of the operations, and (e) the control section resumes operation from the sleep mode several clocks before completion of conversion of the electric signal into a the digital signal after the input/output section receives the electric signal for a subsequent operation.

4. An optical disc device, comprising:

an optical head which emits a light beam to an optical disc having a track for recording data, the optical head including a converting section which converts, into an electric signal, light reflected from the optical disc or light transmitted through the optical disc, a focus actuator for moving a focus of the light beam perpendicularly to a data surface of the optical disc, and a tracking actuator for moving the light beam in a radius direction of the optical disc, a disc motor for rotating the optical disc, an interrupt signal generating section for generating an interrupt signal in each of a plurality of first predetermined time periods, and a control section which receives a digital signal indicating a current state or a deviation from a target value from the optical head and the disc motor and performs an operation according to the digital signal so as to obtain and output a control signal indicating a control amount, and an input/output section which receives an electric signal, converts the electric signal into the digital signal, outputs the digital signal to the control section, receives a control signal from the control section, converts the control signal into an analog signal, and outputs the analog signal to the optical head and the disc motor, wherein (a) the control section performs the plurality of operations every time the interrupt signal is received from the interrupt signal generating section, (b) the control section stops operating and goes into a sleep mode at least for a predetermined time period between reception of the interrupt signal and reception of a subsequent interrupt signal, (c) the control section receives the digital signal and outputs the control signal in each of the operations, (d) the control section goes into the sleep mode for a second predetermined time period after performing one of the operations so as to output the control signal to the input/output section, and (e) the control section resumes operation from the sleep mode after a lapse of the second predetermined time period.

* * * * *